Jan. 6, 1970 — J. H. BRISTER — 3,487,926

SEED RECLAIMING TRAILER FOR COMBINES

Filed March 26, 1968 — 2 Sheets-Sheet 1

James H. Brister
INVENTOR.

BY Clarence A. O'Brien
and Harvey B. Jacobson
Attorneys

Jan. 6, 1970  J. H. BRISTER  3,487,926
SEED RECLAIMING TRAILER FOR COMBINES
Filed March 26, 1968  2 Sheets-Sheet 2

James H. Brister
INVENTOR.

United States Patent Office 3,487,926
Patented Jan. 6, 1970

3,487,926
SEED RECLAIMING TRAILER FOR COMBINES
James H. Brister, 715 Mimbres St.,
Las Cruces, N. Mex. 88001
Filed Mar. 26, 1968, Ser. No. 716,022
Int. Cl. B07b 1/34
U.S. Cl. 209—348        4 Claims

ABSTRACT OF THE DISCLOSURE

An open top trailer is hitched to the rear of a combine and receives chaff therefrom. Inclined screening means vibrate so as to agitate the chaff deposited thereon which filters residual seeds retained in the chaff into a bin area. The screen is caused to vibrate by means of pitman arms connected to one end of the screen. Actuation of the pitman arms is produced by cranks to rotate by a gasoline engine.

---

The present invention relates to harvest machines and more particularly to a machine for reclaiming residual seeds in combine processed chaff.

During a harvesting operation, a great quantity of crops are cut for seed by combines which also cause separation of seeds from chaff. However, there is a great loss of seed yield through improper separation by a combine. Experience has shown that this loss can run well over 100 lbs. per acre with such seed as alfalfa and clover. An inefficient reclamation of seed from a crop results in financial loss to those members of the agricultural community who market seeds. Accordingly, it would be advantageous to reclaim residual seeds contained in combine procesed chaff.

The present invention is connected to the rear of a combine and receives chaff deposited therefrom. This machine is new and useful because it screens chaff normally deposited in the field thereby giving the farmer a chance to recover a large portion of residual seeds contained in combine processed chaff now lost when a combine alone is used. Accordingly, the present invention offers a means for increasing the economic yield by farmers interested in collecting the maximum seed output from a crop. The invention basically includes an open top trailer with a vibrating screen disposed therein. The screen is inclined downwardly from front to rear causing the chaff deposited thereon by the combine to move downwardly across the screen surface causing separation of residual seed from the chaff into a bin area underneath. The coarser chaff material cannot pass through the screen and therefore flows downwardly across the screen to an exit port formed in the trailer. The depleted chaff is thereafter deposited on the field as the combine and the trailer move along. Thus, seed reclamation is completed substantially simultaneously with combine operation in the field.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
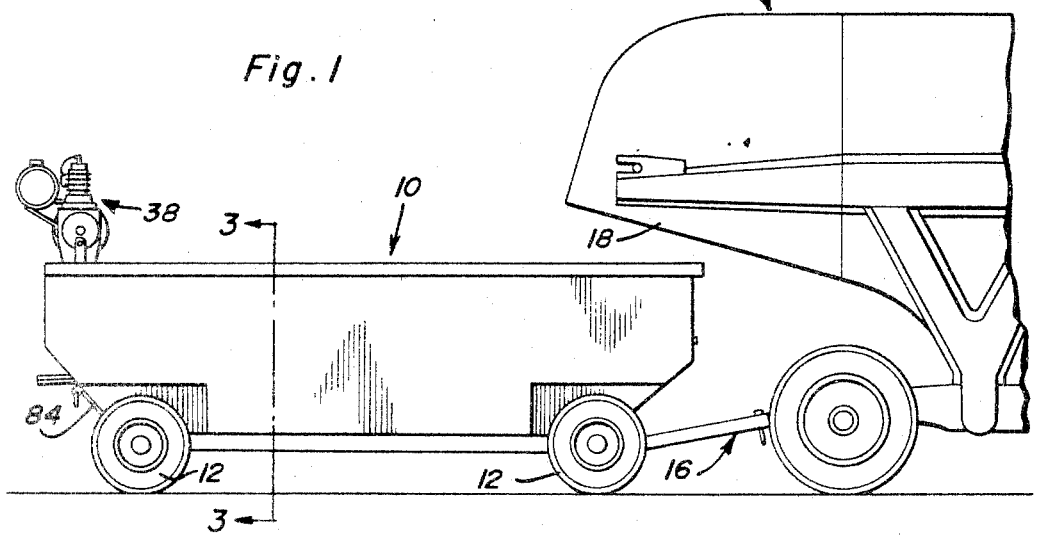
FIGURE 1 is a front elevational view of the present reclaiming tractor hitched to the rear of a combine.
Figure 4:
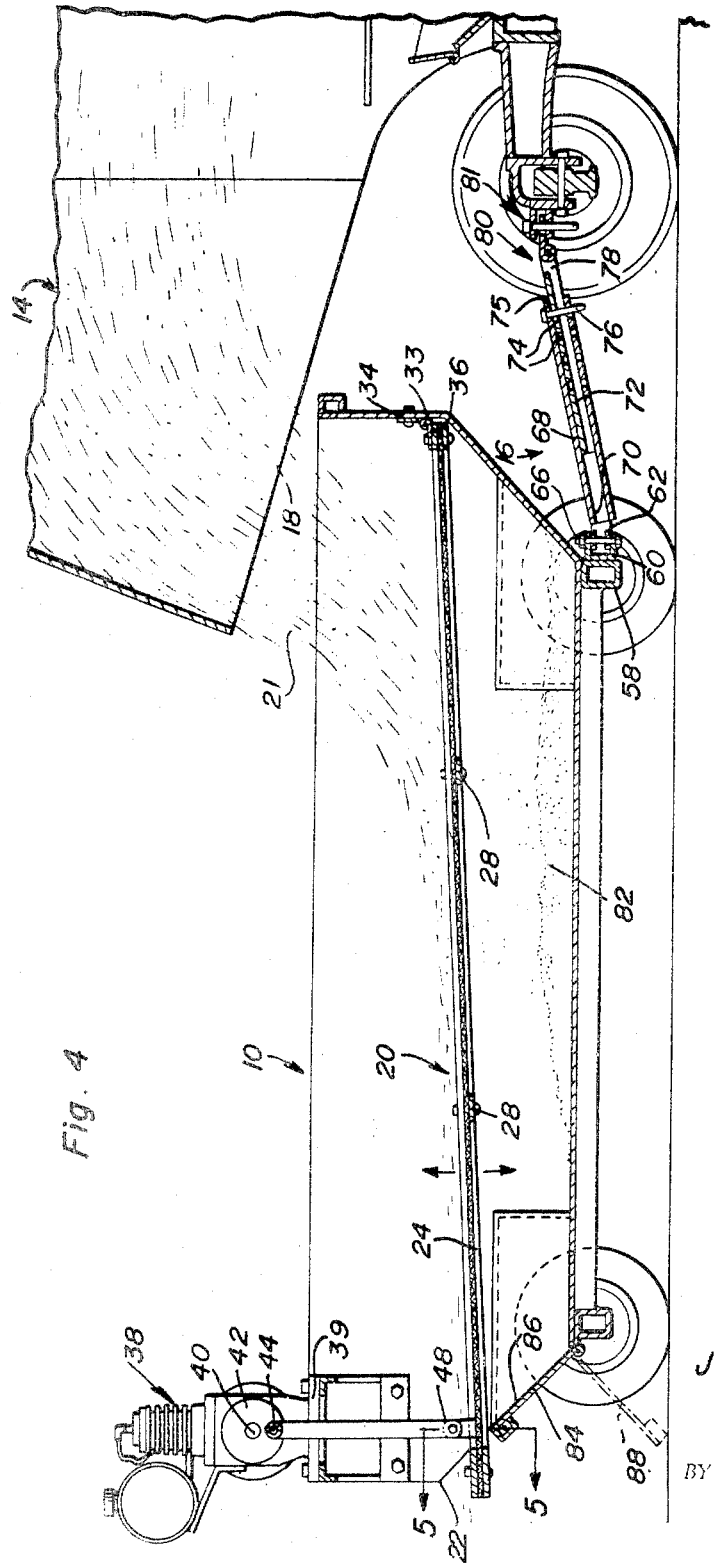
FIGURE 4 is a sectional view taken along a plane passing through section line 4—4 of FIGURE 2 exposing the interior components of the present invention.

Referring specifically to the drawings, and more particularly to FIGURE 1 therein, reference numeral 10 generally denotes a seed reclaiming tractor mounted upon forward and rearward wheel asemblies 12. The trailer includes an open top wagon or container portion which is characterized as a frustoconical structure including straight lateral sides appending downwardly into tapered front and rear wall portions. The front portion of the trailer underlies the separator exit of a combine 14. The trailer is connected to the combine by means of a hitch assembly generally denoted at 16. FIGURE 4 clearly illustrates the flow of chaff 21 from the rear of combine 14 through a rearwardly disposed hood 18.

Figure 2:
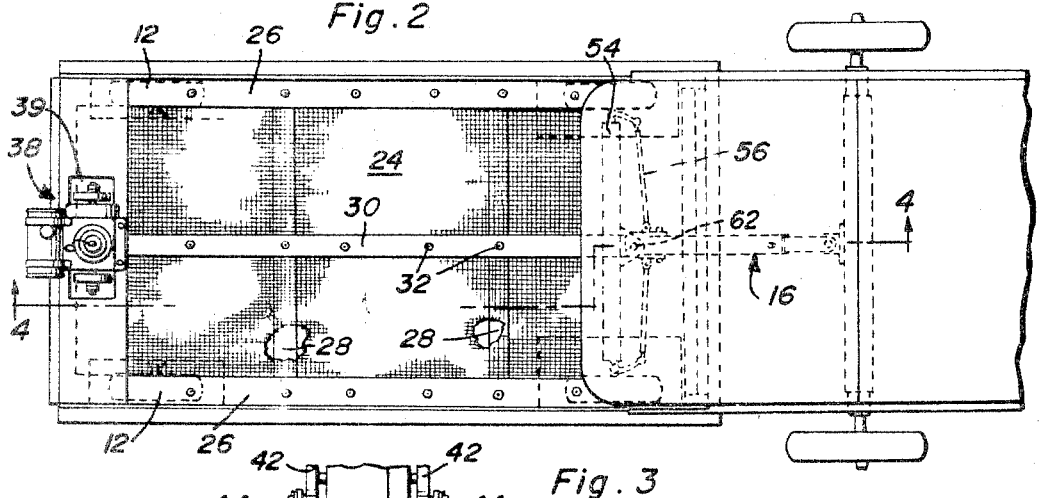
FIGURE 2 is a top plan view of the apparatus shown in FIGURE 1.

Attention is directed to FIGURES 2 and 4 which illustrate the interior of the trailer. FIGURE 4 illustrates a vibrating screening means 20 which is downwardly inclined toward the rear wall, the screening means is caused to vibrate as hereinafter explained so that chaff 21 is caused to move downwardly along the screen means to an exit port 22 formed in the rear wall of the trailer. FIGURE 2 illustrates the construction of screening means 20 which is seen to include a screen 24 within a peripheral frame 26, the screen being further supported by cross-braces 28 connecting the longitudinal sides of the frame 26. Additional support is rendered by a medially disposed brace 30 which is parallel to the longitudinal sections of the peripheral frame 26. The aforementioned support means are more clearly shown in FIGURE 4 to sandwich the screen between overlying structural members fastened by suitable fasteners 32. By way of example, the screen may be fabricated from .06 to 1.00 wire mesh.

As seen in FIGURE 4, the upper inclined end of screening means 20 is pivotally secured by a suitable hinge 33 at one end thereof to the interior surface of the front trailer side by suitable fasteners 34. The opposite end of the hinge is suitably fastened to screen means 20 as indicated by 36.

Figure 3:
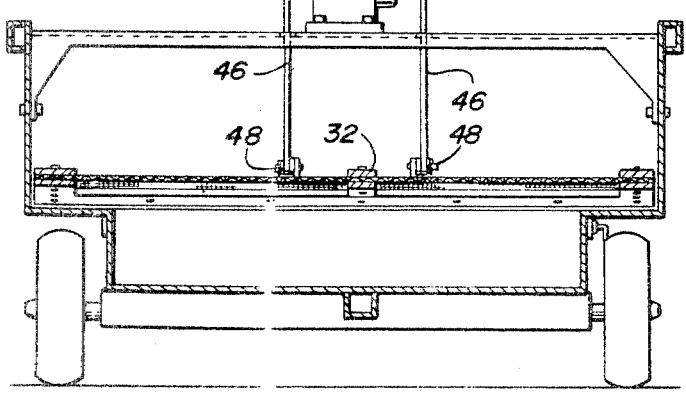
FIGURE 3 is a partial transverse sectional view taken along a plane passing through section line 3—3 of FIGURE 1.
Figure 5:
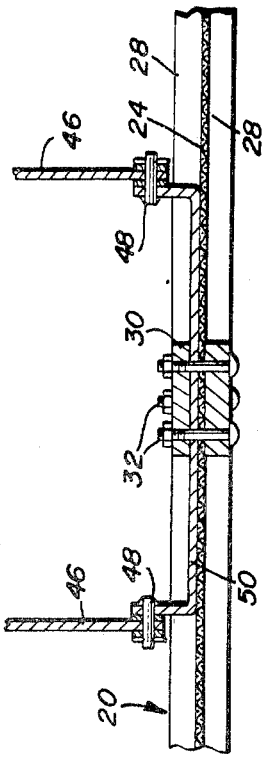
FIGURE 5 is a partial sectional view taken along a plane passing through section line 5—5 of FIGURE 4.

In operation of screening means 20, the rear end thereof is caused to vertically oscillate or vibrate between an upper horizontal position and a lower downwardly inclined position around an axis of rotation defined by hinge 33 at the opposite end thereof. The motive power for producing this vibration is created by a suitable engine denoted by 38 which by way of example may be a quarter horsepower gasoline engine suitably mounted to a rearward cross-brace 39 as indicated in FIGURE 2. The engine includes a drive shaft 40 extending outwardly from either side of the engine housing in a transverse direction. An outward end of the shaft 40 mounts a flywheel member 42 coaxially thereon. As seen in FIGURE 3, a radially outward portion of each flywheel includes a crank member 44 thereon for pivotally mounting a pitman arm 46 at one end thereof. The opposite end of each pitman arm is received within a respective pivotal securement 48. This particular securement is shown in detail in FIGURE 5. It is noted that both pitman arms are retained in parallel aligned relation during pivotal motion thereof. The pivotal securement includes a U-shaped mounting plate 50 connected to the rear end portion of the screening means 20 by the clamping action of overlying cross-brace members 30.

FIGURE 2 illustrates a steering rod mechanism 56 for causing front wheel axle 54 to turn in accordance with the connecting hitch 16. The specific components of hitch 16 are shown in FIGURE 4 of the drawings wherein a U-shaped plate 60 has its outward bight surface affixed to the forwardly facing outward surface of hollow axle shaft 58. A coupling member 62 is inserted within the U-shaped plate 60, the aforementioned plate and coupling include aligned apertures therein for receiving a retaining pivot pin 66 therethrough. This latter mentioned connection permits swivelling of hitch means 16 in horizontal plane. The outward end of coupling 62 is inserted within an adjacent end portion of a hollow pipe 68 characterized by way of example by a rectangular cross-section. Horizontally aligned apertures are formed therethrough for receiving a second retaining pivot pin 70 which also passes through the concentrically disposed coupling 62 and pipe section 68 for permitting the vertical rotation of hitch means 16 about pin 70. A telescoping adjustment is facilitated by inserting a generally U-shaped channel member 72 concentrically within hollow pipe 68. Longitudinally aligned apertures 74 formed in channel member 72 may be individually aligned with an aperture 75 formed in hollow pipe 68 thereby permitting sliding adjustment of the insertion of channel 72 in pipe 68. Securement in an adjusted position is completed by means of a securing pin 76 passing through finally aligned holes 74 and 75. The outward end 78 of channel member 72 terminates in a coupling assembly 80 which cooperates with an associated coupling assembly 81 mounted upon the rear axle of combine 14 to produce a capability of horizontal and vertical rotation as previously discussed.

In operation of the device during traverse of the field, reclaimed seeds filter through screen 24 and are deposited in a lower section of trailer 10 denoted as bin 82. At the termination of a fielding operation, the seeds may be retrieved through an access door 84 shown in FIGURE 4 which normally occludes an access portion 86 formed within the lower rear wall of the trailer. Opening of the access door is denoted by 88.

What is claimed as new is as follows:

1. A trailer vehicle to be drawn behind a harvesting machine, the vehicle serving to reclaim seed from the waste material of the harvesting machine, the vehicle comprising an open top container for receiving the waste material, screen means having first and second ends thereof disposed in said container, the second end being variably inclined downwardly with respect to the first end, means for pivotally securing the first end of said screen means, the volume below the screen means serving as a storage bin for reclaimed seeds, pitman means having first and second ends, the first end of the pitman means connected at one end thereof to the second end of the screening means, crank means pivotally connected to the second end of the pitman means, prime mover means, the crank means operatively associated with the prime mover means, the bin having a door hingedly mounted to permit access to the interior of the bin for removal of reclaimed seeds, the container having a rear opening, the second end of the screen means being located in the opening to permit the exit of waste material from the screen.

2. The apparatus set forth in claim 1 wherein said container comprises frame means, forward and rearward wheel means, a frusto-conical open top wagon mounted on said frame, and hitch means for permitting connection of said wagon to a harvesting machine, said hitch means being rotatable in vertical and horizontal plane.

3. The apparatus set forth in claim 1 together with hitch means connecting said container to a towing vehicle, said hitch means including first coupling means at a first end section thereof for permitting hitch rotation in a horizontal plane, second coupling means at said first end section for permitting hitch means rotation in a vertical plane, and telescoping shaft means disposed between said first hitch means end and the opposite end thereof for allowing adjustment of the length of said hitch means.

4. The combination of claim 1 wherein the crank means includes two laterally spaced crank wheels and wherein said prime mover means includes engine means having a driveshaft, said crank wheels being coaxially mounted upon said drive shaft, and further wherein said plurality of pitman means include two laterally spaced pitman arms connected between respective crank wheels and said screening means.

References Cited

UNITED STATES PATENTS

| | | | |
|---|---|---|---|
| 595,523 | 12/1897 | Cherry | 209—348 X |
| 798,256 | 8/1905 | Bell | 209—348 X |
| 1,297,054 | 3/1919 | Arenson | 209—348 |
| 1,976,180 | 10/1934 | Marot | 209—349 X |
| 2,037,491 | 4/1936 | Wagoner | 56—473.5 |
| 2,243,975 | 6/1941 | Mold | 209—420 X |
| 2,617,425 | 11/1952 | Dion | 130—24 |
| 2,647,630 | 8/1953 | Kling | 209—348 |

FOREIGN PATENTS

| | | |
|---|---|---|
| 634,715 | 12/1933 | Germany. |

HARRY B. THORNTON, Primary Examiner

R. HALPER, Assistant Examiner

U.S. Cl. X.R.

56—473.5; 130—24; 209—421